(12) United States Patent
Frisch et al.

(10) Patent No.: US 6,290,299 B1
(45) Date of Patent: Sep. 18, 2001

(54) HEADREST WITH A SEAT BELT SYSTEM

(75) Inventors: Arnulf Frisch, Stuttgart; Wolfgang Jacob, Hochdorf; Hans Janner, Allmersbach; Gerhard Mack, Winnenden, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/459,463

(22) Filed: Dec. 13, 1999

(30) Foreign Application Priority Data

Dec. 12, 1998 (DE) ............................................... 198 57 387

(51) Int. Cl.⁷ .................................................... B60R 22/28
(52) U.S. Cl. ............................................ 297/410; 297/483
(58) Field of Search .................................. 297/410, 391, 297/483, 464, 216.1, 216.12

(56) References Cited

U.S. PATENT DOCUMENTS

| | | | |
|---|---|---|---|
| 4,285,545 | * | 8/1981 | Protze . |
| 5,330,228 | * | 7/1994 | Krebs et al. . |
| 5,390,982 | | 2/1995 | Johnson et al. ...................... 297/410 |
| 5,658,048 | * | 8/1997 | Nemoto . |

FOREIGN PATENT DOCUMENTS

| | | |
|---|---|---|
| 3807928 | 7/1991 | (DE) . |
| 3020558 | 4/1992 | (DE) . |
| 197 04 571 | 6/1998 | (DE) . |
| 198 51 650 | 5/2000 | (DE) . |
| 00-25504 | 1/2000 | (JP) . |

\* cited by examiner

*Primary Examiner*—Milton Nelson, Jr.
(74) *Attorney, Agent, or Firm*—Crowell & Moring, L.L.P.

(57) ABSTRACT

An arrangement for coupling the vertical position of a headrest assigned to a backrest of a motor vehicle seat with the withdrawal and retraction movement of a seat belt system with a belt retractor. When the seat belt is put on by a vehicle occupant sitting in the vehicle seat, the withdrawal movement of the belt strap is transformed into a movement of the headrest from a lower inoperative position into an upwardly displaced operative position. When the seat belt is taken off, the retraction movement of the belt strap is transformed into an opposite movement of the headrest back into the inoperative position. The arrangement comprises a locking unit for fixing the headrest can be fixed in its operative position. Starting from its operative position, the headrest can be vertically displaced with respect to the backrest and can be locked in the respective adjusted position.

17 Claims, 4 Drawing Sheets

HEADREST WITH A SEAT BELT SYSTEM

BACKGROUND OF THE INVENTION

This application claims priority of DE 198 57 387.1-16, filed Dec. 12, 1998, the disclosure of which is expressly incorporated by reference herein.

The present invention relates to an arrangement for coupling the vertical position of a headrest assigned to a backrest of a motor vehicle seat with the withdrawal and retraction movement of a seat belt system with a belt retractor. More particularly, the present invention relates to an arrangement in which when the seat belt is put on by a vehicle occupant sitting in the vehicle seat, into a movement of the headrest from a lower inoperative position into an upwardly displaced operative position and, when the seat belt is taken off, into an opposite movement of the headrest back into the inoperative position, and the arrangement comprising a locking unit by means of which the headrest can be fixed in its operative position.

An arrangement is described in DE 38 07 928 C2, in which, when an occupant sitting in the motor vehicle seat puts on a seat belt, the withdrawal movement of a belt strap is transformed into a movement of the headrest from an inoperative position into an operative position displaced in the upward direction. Correspondingly, when the seat belt is taken off, the retraction movement of the belt strap is transformed into an opposite movement of the headrest back into the inoperative position. The arrangement is suitable particularly for vehicle seats in the rear of an occupant compartment because, when the seat in unoccupied, the headrest is in the bottom operating position and therefore allows the driver of the motor vehicle an unimpaired view to the rear over the unoccupied seats.

In the backrest of the known vehicle seat, a gearing is provided which transforms the rotating movement of a retractor during the withdrawal movement and the retraction movement of the belt strap into an adjusting movement of the headrest approximately in the longitudinal direction of the backrest. For this purpose, the rotating movement of the retractor is transmitted by way of an adjusting shaft to a driving pinion which, in the lower operating position of the headrest, engages with a serrated strip arranged on a guide rod of the headrest.

In addition, the adjusting shaft actuates a locking member by way of which the headrest can be locked in the operative position. For this purpose, the locking member comprises a locking bolt which interacts with a locking recess in the guide rod of the headrest. As soon as, in the course of the withdrawal movement of the seat belt, while the belt is approximately half pulled out, the headrest has reached its upper operative position, the locking bolt slides into the locking recess in the guide rod and slightly lifts the guide rod so that the serrated strip disengages from the driving pinion. As a result, the headrest is locked at the height pinion. As a result, the headrest is locked at the height predetermined by the locking recess. When the seat belt is taken off, the locking bolt interacts with the locking recess such that the serrated strip engages again with the driving pinion and the headrest can therefore be changed back into the inoperative position.

Another known arrangement is described in DE 30 20 558 C2, in which, when the seat belt is put on and taken off, the vehicle occupant sitting in the motor vehicle seat transforms the withdrawal or retraction movement of the belt strap into a swivelling movement of the headrest from a lower deposited position into an upper operative position. For this purpose, for example, by way of a buckle latch of the seat belt introduced at the end of buckling operation into a belt buckle, a circuit is closed, and the headrest is swivelled upward by an electric gearing connected to the circuit. In the operative position, the headrest is secured in a defined position a brake assigned to the geared motor. When the buckle latch is unlatched, a reversed control of the geared motor and a return of the headrest into the deposited position takes place.

SUMMARY OF THE INVENTION

An object of the present invention is to provide an arrangement which permits an improved adjustment of the headrest with respect to a vehicle occupant's individual requirements.

According to the present invention, this object has achieved by an arrangement in which starting from the operative position, the headrest can be displaced in the vertical direction with respect to the backrest and can be lockable in a desired adjusted position.

The arrangement according to the present invention allows the headrest which, after the seat belt was put on, to be displaced upward into the operative position and to be locked by the locking unit. The headrest is vertically slidable starting from its operative position, with respect to the backrest and can be locked in the respective adjusted position. The vertical position of the headrest can advantageously be adapted to the position of the head of the vehicle occupant who sat down in the seat and has buckled the seat belt. As the result of this measure, the fact can be taken into account that, in the event of an accident, the headrest adjusted to the correct height can enormously contribute to the victim's chance of surviving such an accident without serious injury to his neck region. Simultaneously, a headrest set to the correct height will protect the head from pieces of luggage which, in the event of an impact, may be thrown from the rear toward the front.

Thus, the translational movement of the headrest from the inoperative position into the operative position approximately in the longitudinal direction of the backrest has been found to be particularly advantageous because the headrest can be changed into the operative position along the shortest path and relatively little space is required during the sliding of the headrest.

By virtue of a lifting slide carriage coupled with the belt strap with respect to the movements, the headrest can be moved corresponding to the lower and upper position of the lifting slide carriage, between the inoperative and the operative position and can be locked therein. By way of the headrest receiving device, the headrest can be vertically slid in a simple manner with respect to its distance from the lifting slide carriage and can be locked in the adjusted position, whereby the lifting slide carriage in its upper position is releasably locked on the backrest.

As a further aspect of the invention, when the belt buckle is unlocked, the lifting slide carriage is simultaneously released again from its locked upper position and a simple possibility is therefore provided of moving the headrest, from the beginning of the retraction movement, when the seat belt is taken off, back into the inoperative position.

It has been found to be particularly advantageous for the distance between the lifting slide carriage and the headrest to be constant during its movement from the inoperative position into the operative position and back from the operative position. Thus, a vehicle occupant who sits down several times successively in the same seat does not have to newly adjust his optimal operative position of the headrest.

As a yet further development of the invention, a gear unit which couples the withdrawal or retraction movement of the belt strap with the movement of the lifting slide carriage and has a frictional wheel unit was found to require particularly little servicing and be reasonable in cost.

Finally, it has been found to be particularly advantageous to uncouple, when its inoperative position has been reached, the movement of the headrest from the retraction movement of the belt strap, via a free wheel, whereby less force must be applied by the automatic retractor for retracting the residual belt strap.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
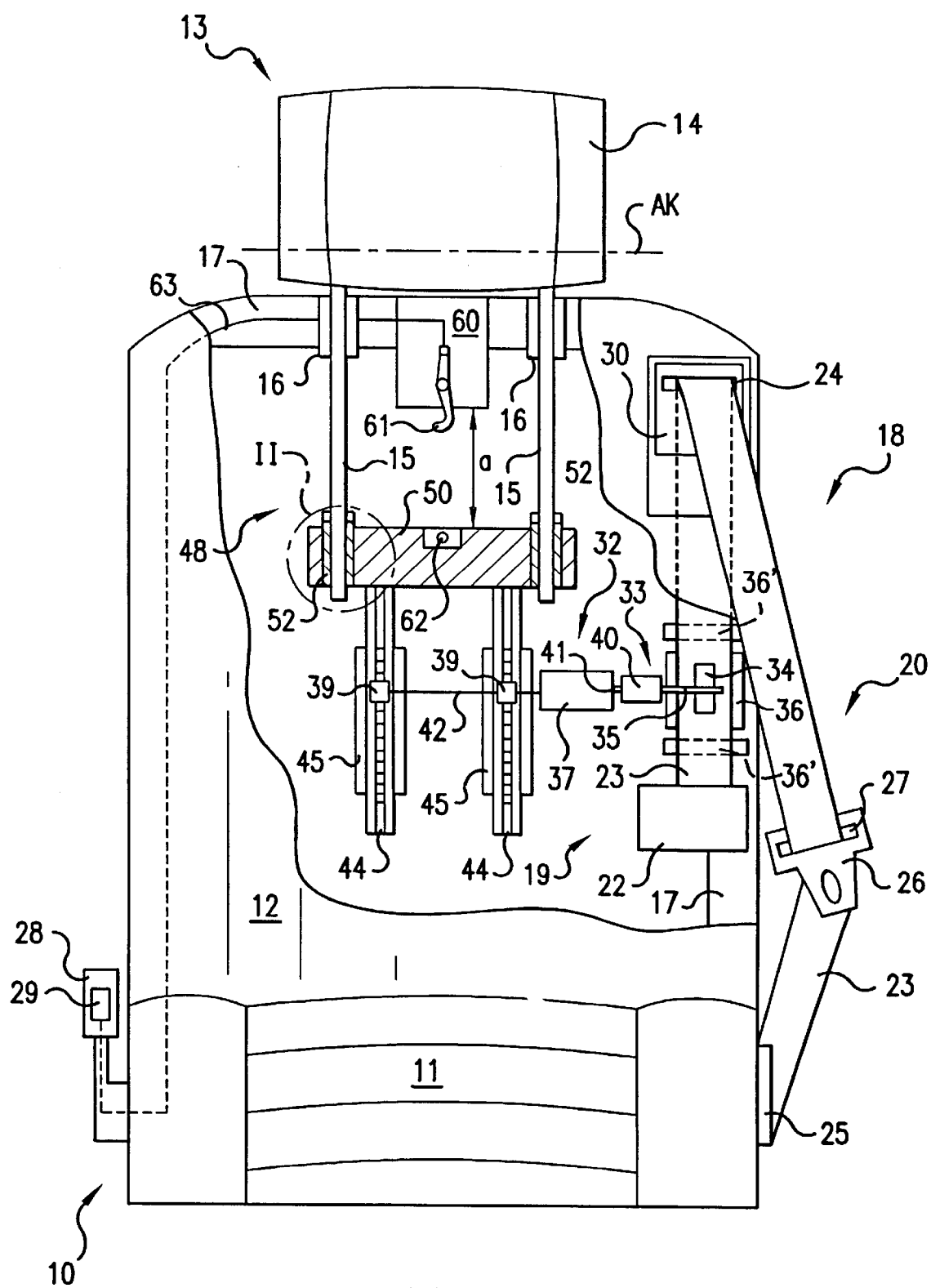
FIG. 1 is a schematic front view of a motor vehicle seat with an arrangement for coupling a headrest with a seat belt system according to a preferred embodiment of the invention, the headrest being arranged in a lower inoperative position.

FIG. 1 is a front view of an integral motor vehicle seat 10 which comprises a seat cushion 11 and a partially sectionally illustrated backrest 12. Above the backrest 12, a headrest 13 is illustrated in a lower inoperative position approximately resting against the upper end of the backrest 12. The headrest 13 has a head cushion 14 and two guide rods 15 which extend in the longitudinal direction of the backrest 12. The head cushion 14, swivellable about an approximately horizontal swivel axis AK and adjustable and lockable at an inclination angle with respect to the backrest 12, is connected with the guide rods 15 in an articulated manner. The guide rods 15 are longitudinally slidably held in one sliding guide 16 respectively, which are fastened on a frame 17 of the backrest 12 which is outlined only in a cutout portion. Thereby, the headrest 13 can be moved from the lower inoperative position approximately in the longitudinal direction of the backrest 12 in the upward direction.

The motor vehicle seat 10 is equipped with a seat belt system 18 which has a seat belt 20 which is constructed as a three-point belt with an automatic retractor system 19 and is almost completely retracted in FIG. 1. The automatic retractor system 19 is arranged laterally on the frame 17 of the backrest 12. The automatic retractor system 19 comprises a belt retractor 22 which is arranged in the lower area of the backrest 12 and at which the belt strap 23 of the seat belt 20 is fastened by its one end and is wound up to form a seat belt winding. When the seat belt 20 is taken off, the belt strap 23 is automatically rolled up by the automatic retractor system 19.

In the event of an impact of the vehicle, the belt retractor 22 is locked by a known type of locking mechanism (not shown), whereby a winding-off of the belt strap 23 from the belt winding is prevented. At the upper end of the backrest 12, a deflecting roller 24 is associated with the seat belt system 18 and is used for deflecting the belt strap 23. In order to permit a particularly good adjustment of the seat belt 18 to the person sitting in the seat, the deflecting roller 24 illustrated in FIG. 1 can be moved vertically by a belt slide carriage 30 and then locked.

The other end of the belt strap 23 is fastened by a fastening fitting 25 on a frame of the seat cushion 12 which is not shown. Likewise, it would also be within the contemplation of the present invention to fasten this end of the belt strap 23 on the vehicle body floor. A buckle latch 26 is associated with the seat belt 20, into which the belt strap 23 is looped through a belt opening 27, whereby the buckle latch 26 can slide along the belt strap 23. The buckle latch 26 can be fitted into a buckle 28 having a locking mechanism. The buckle 28 is fastened on the side of the seat frame 17 facing away from the fastening fitting 25. After the insertion of the buckle latch 26, the buckle 28 automatically latches and thus causes the secure fixation of the buckle latch 26. Like the fastening fitting 25, the buckle 28 can also be fixed to the vehicle body floor. By way of an unlatching key 29 assigned to the buckle 28, the latching can be eliminated again and the buckle latch 26 can be removed again from the buckle 28.

A gear unit 32, to which a friction wheel unit 33 is assigned, is provided in the interior of the backrest 12. The friction wheel unit 33 includes a friction wheel 34 which is fixedly connected with a friction wheel shaft 35, for example, by way of a form-locking connection or by a welded connection. In order to transform the translational movement of the belt strap 23 via the friction wheel 34 into a rotatory movement of the friction wheel shaft 35, a contact pressure surface 36 is assigned to the friction wheel unit 33.

The contact pressure surface 36 has a spring element which, viewed in the longitudinal direction of the vehicle, is arranged behind this contact pressure surface 36. Thereby, the belt strap 23 sliding through between the friction wheel 34 and the contact pressure surface 36 is pressed by means of the frictional force required for transmitting the translational into the rotatory movement against the surface area of the friction wheel 34. The contact pressure surface 36 preferably has a relatively smooth surface so that the belt strap 23 can slide along on it without any major frictional losses.

In contrast, the surface area of the friction wheel 34 is preferably made of rubber or a similar material which is suitable for transmitting the frictional force and therefore permits a complete transformation of the belt movement into a rotating movement of the friction wheel shaft 35. Instead of the contact pressure surface 36, one contact pressure shaft 36' respectively, which is arranged above and below the friction wheel 34 and is illustrated by a broken line in FIG. 1, can also be used, to press the belt strap 23 is pressed against the friction wheel 34.

A gearing 37 is connected behind the friction wheel unit 33 and transmits the rotating movement generated by the friction wheel 34 to two gear wheels 39 preferably constructed as spur toothed wheels. A free wheel 40 is arranged between the friction wheel 34 and the gearing 37. The gear shafts 35, 41, 42 for the friction wheel 34, the free wheel 40 or the gearing 37 and the gear wheels 39 are rotatably disposed on receiving devices which are fastened to frame profiles of the backrest 12.

The two gear wheels 39 engage with one toothed rack 44 respectively of the gear unit 32 to change the rotating movement of the gear wheels 39 again into a translational movement of the toothed racks 44. The toothed racks 44 are longitudinally slidably in the vertical direction of the vehicle received in slide guides 45 arranged on the frame profile 43. The toothed racks 44 preferably consist of a square bar whose lateral surface is provided with a toothed strip. Of course, instead of a square bar, any other profile can also be used, particularly a round bar.

The upper ends of the two toothed racks 44 are fixedly connected, e.g., welded or screwed, with a lifting slide carriage 50 associated with a locking unit 4. Thereby, a vertical movement of the toothed racks 44 is transmitted to the lifting slide carriage 50 and the latter can be displaced from the lower position illustrated in FIG. 1 to an upper position illustrated in FIG. 4. In the embodiment illustrated, the lifting slide carriage 50 is longitudinally slidably guided only by the slide guides 16 of the guide rods 15. Likewise, separate guides, such as rails or the like, can be provided for the lifting slide carriage 50.

Figure 2:
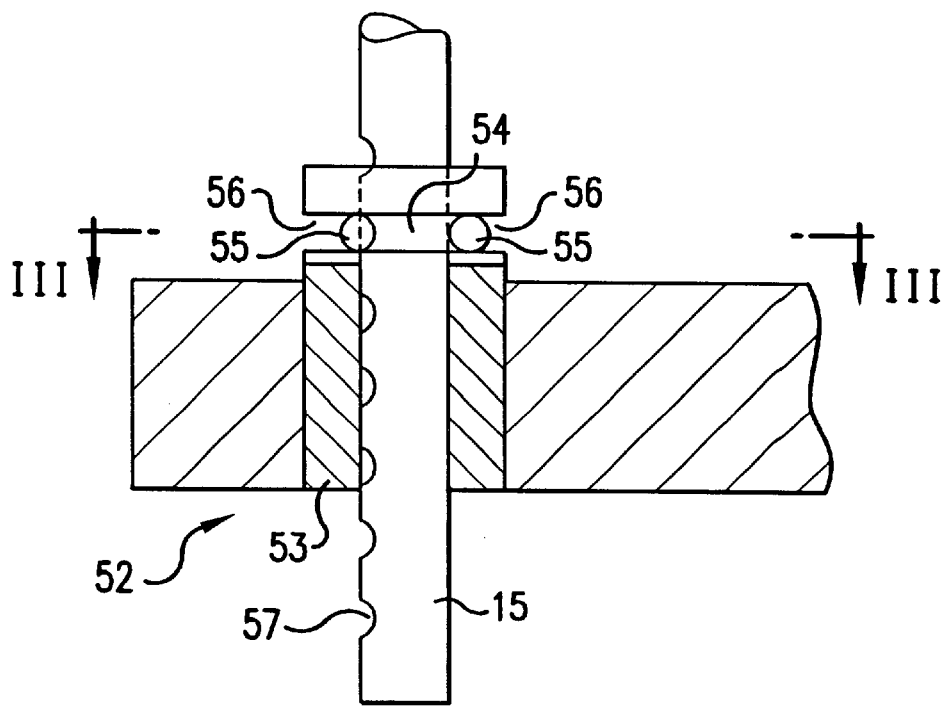
FIG. 2 is an enlarged view of detail II in FIG. 1.

The lifting slide carriage 50 has two headrest receiving devices 52, to vertically displace the headrest 13 with respect to its distance b (FIG. 4) from the lifting slide carriage 50 and can be locked in the adjusted position. As illustrated particularly in FIGS. 2 and 3, the headrest receiving device 52 has an approximately hollow-cylindrical guide sleeve 53 in which one of the guide rods 15 respectively is received with a sliding fit. In order to lock the guide rods 15 in a position adjusted by the vehicle occupant, one spring clip 54 respectively is provided on the respective guide sleeve 53 and is arranged perpendicularly to the latter.

The legs 55 of the spring clip 54 are clamped into approximately tangential and mutually diametrically opposite openings 56 which penetrate the sleeve 53.

Figure 3:
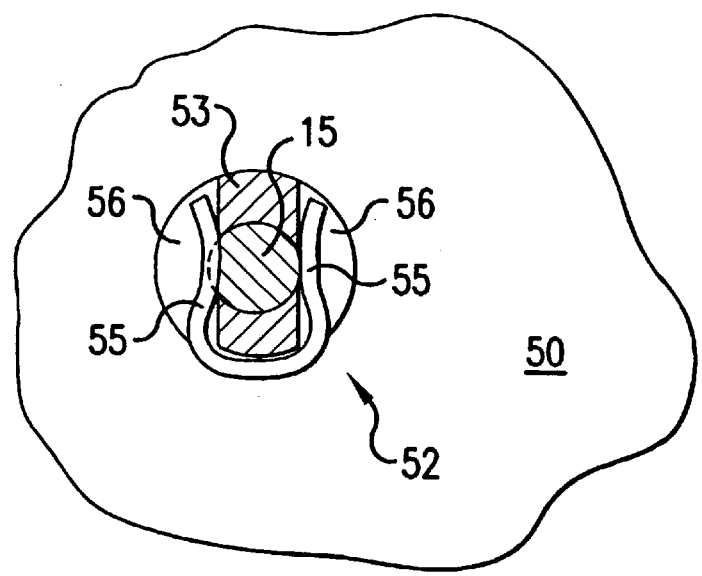
FIG. 3 is a cutout-type sectional view of the headrest receiving device along line III—III in FIG. 2.

As illustrated in the top view of FIG. 3, the legs 55 are spaced away from one another by less than the diameter of the guide sleeve 53 and engage in toothed strips 57 in the guide rods 15 such that the guide rods 15. Thereby the guide rods 15 can be locked with a certain holding force in steps with respect to the guide sleeves 53. Instead of the stepped locking, a continuous adjustability is also within the contemplation of the present invention.

Figure 4:
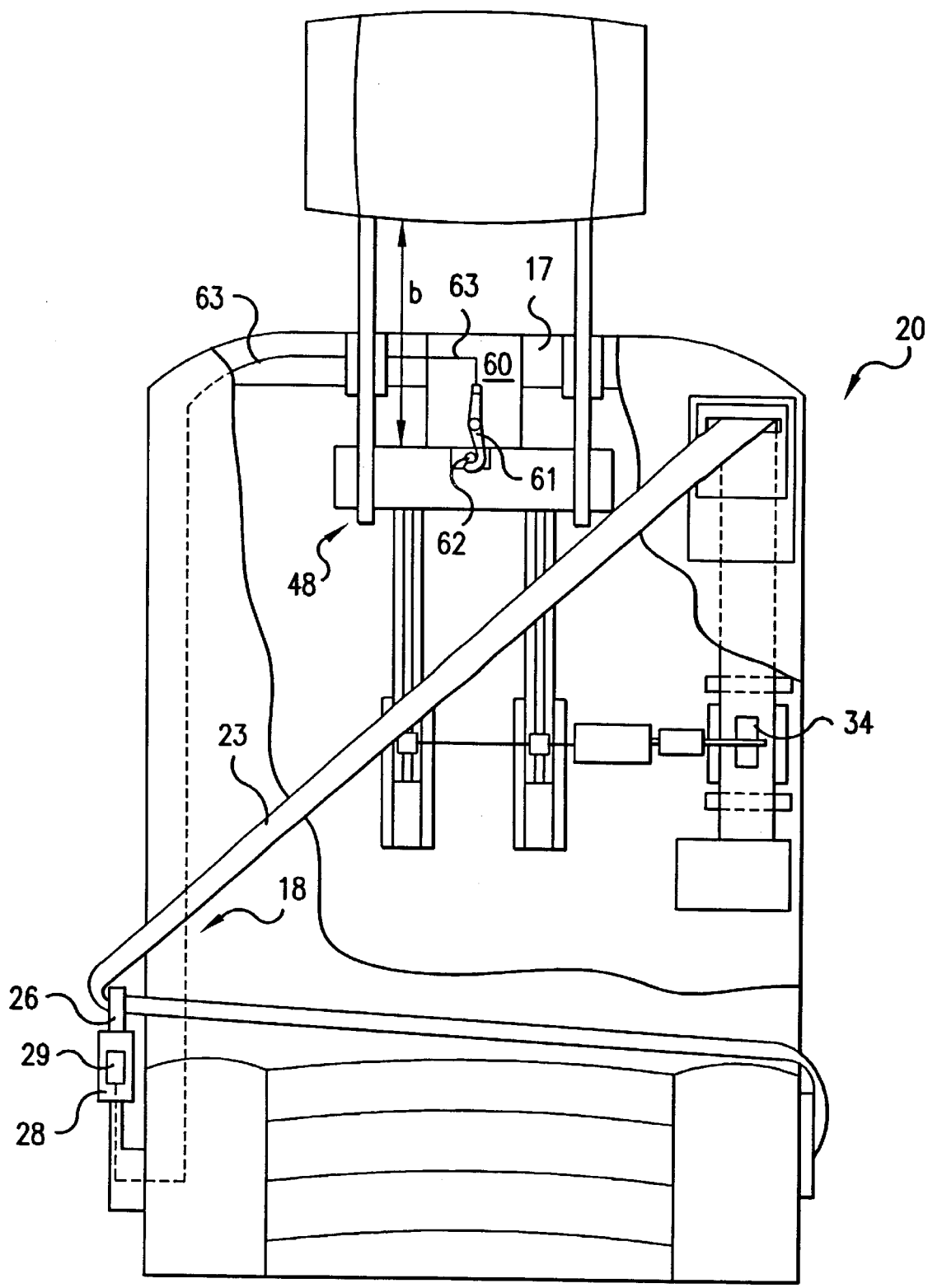
FIG. 4 is a schematic front view of the motor vehicle seat with the arrangement according to FIG. 1, in which the headrest is arranged in an upwardly displaced operative position.

For locking the lifting slide carriage 50 in its upwardly displaced position illustrated in FIG. 4, a lifting slide carriage locking device 60 is associated with the locking unit 48 and is fixedly connected with the frame 17 of the backrest 12. The lifting slide carriage locking device 60 is equipped with a locking mechanism illustrated in a simplified manner as a swivellable hook 61. The locking mechanism automatically locks in a lug 62 arranged on the lifting slide carriage 50 and therefore locks the lifting slide carriage 50 in its upper position. The locking unit 48 has a triggering line 63 so that when the unlocking key 29 is operated and during the connected taking-off of the seat belt 20, the lifting slide carriage locking device 60 is unlocked again from the lug 62 and thus the lifting slide carriage 50 is released again from its locked upper position into a downwardly displaced position.

FIG. 4 shows the seat belt 18 in a withdrawn state with the buckle latch 26 fitted into the buckle 28 after the vehicle occupant has completely put on the seat belt, for reasons of clarity, the vehicle occupant not being illustrated. During the withdrawal movement of the belt strap 23, the lifting slide carriage 50 has been displaced by the lift length a (FIG. 1) into the upper position and has been locked by the lifting carriage locking device 60.

When a vehicle occupant puts on the seat belt 20 which is completely retracted in FIG. 1, the movement of the belt strap 23 is changed by way of the friction wheel unit 33 into a rotational movement, is then transmitted by the gear unit 32 and is transformed again by the toothed racks 44 engaged with the gear wheels 39 into a translational movement approximately in the longitudinal direction of the backrest 12. Corresponding to the movement of the toothed racks 44, the lifting slide carriage 50 is displaced from the lower position into the upper position and thus also the headrest 13 connected with the lifting slide carriage 50 by way of the guide rods 15 is disposed into its upper operative position. In the upper position, the lifting slide carriage 50 is releasably fixed by the lifting slide carriage locking device 60.

The guide rods 15 are held such by the spring elements 54 in the guide sleeves 53 of the headrest receiving devices 52 such that, during the moving-out of the headrest, no relative movement is possible between the sliding lift carriage 50 and the headrest 13 and thus the distance b cannot be changed. That is, the holding force exercised by the spring elements 54 on the guide rods 15 is larger than the force of the weight of the headrest 13 and the frictional forces occurring between the slide guides 16 and the guide rods 15. The transmission ratio of the gearing 37 is preferably sized such that the lifting slide carriage 50 locks in its upper position approximately at a quarter to three quarters of the withdrawal length of the belt strap 23 as required for the respective vehicle occupant depending on the vehicle occupant's girth.

As a result of the locking of the lifting slide carriage 50 in the upper position, the toothed racks 44 connected with the lifting slide carriage 50 can also not continue to move. Thereby the rotational movement of the gear unit 32 with the gear wheels 39, the gearing 37 and the friction wheel 34 is also blocked. So that the withdrawal movement of the belt strap 23, which has not yet been completed, can be continued until the required withdrawal length is reached and the buckle latch 26 is locked in the buckle 28, the frictional force which is exercised on the belt strap 23 by the friction wheel 34 and the contact pressure surface 36 must now be overcome. In other words, the belt strap 23 is withdrawn further against the blocking friction wheel 34 while overcoming the friction force exercised by the friction wheel 34 and the contact pressure surface 36. Although, after blocking of the friction wheel 34, the withdrawal force to be applied by the vehicle occupant must be slightly increased, its magnitude will remain in a range which is comfortable for the vehicle occupant.

After the seat belt has been put on, the headrest 13 can be adjusted, while changing the distance b (FIG. 4), by the vehicle occupant to his individually required height. For this purpose, after overcoming the holding force exercised by the spring clips 54 onto the guide rods 15, the headrest 13 can be manually displaced manually in a stepped manner. It is also contemplated to design the headrest to be electrically movable and lockable with respect to the lifting slide carriage 50.

After operation of the unlocking key 29 when the seat belt 20 is to be taken off, the lifting slide carriage locking device 60 is operated by the triggering line 63, and the lifting slide carriage 50 again is released. The subsequent retraction movement of the belt strap 23 is transmitted again by the friction wheel 34 and the gear unit 32 to the toothed racks 44. Thus, the lifting slide carriage 50 and the headrest 13 are moved downward again.

After approximately one fourth to three fourths of the withdrawn belt strap 23 has been retracted again (according to the vehicle occupant's girth and according to the adjusted operating height of the headrest 13), the headrest 13 is displaced back again in its slower inoperative position close to or onto the upper end of the backrest 12. The lifting slide carriage 50 corresponding to the distance a between the lifting slide carriage 50 and the headrest 13 is then again situated in a lower position and is also not moved further.

So that the friction wheel 34, which is connected by the gear unit 32 and by way of the toothed racks 44 with the lifting slide carriage 50 which cannot be moved further downward, does not block the belt strap 23 during the residual retraction movement, the free wheel 40 is arranged between the gear unit 32 and the friction wheel 34. The free wheel 40 is effective during retraction of the belt strap 23 and thereby permits a continued rotation of the friction wheel 34, although the remaining gear unit 32 is blocked. As a result, the friction wheel 34 can continue to carry out its rotating movement independently of the blocked residual gear unit 32 and therefore does not counteract the residual retraction movement of the strap 23 by the retractor 22.

Because the operative height of the headrest 13 set according to the user will differ and thus the distance b will also with different vehicle occupants, with the headrest 13 moved back into the inoperative position, the lifting slide carriage 50 is at a different height in the lower position. The distance b, which differs according to the vehicle occupant, is therefore maintained after the vehicle occupant had taken off the seat belt 18. If the same person now sits down again in the vehicle seat 10, when the seat belt 20 is put on, the operative position of the headrest 13 which is adapted to this person will automatically be set again because the distance b between the lifting slide carriage 13 and the headrest 13 remains unchanged during its displacement.

Figure 5:
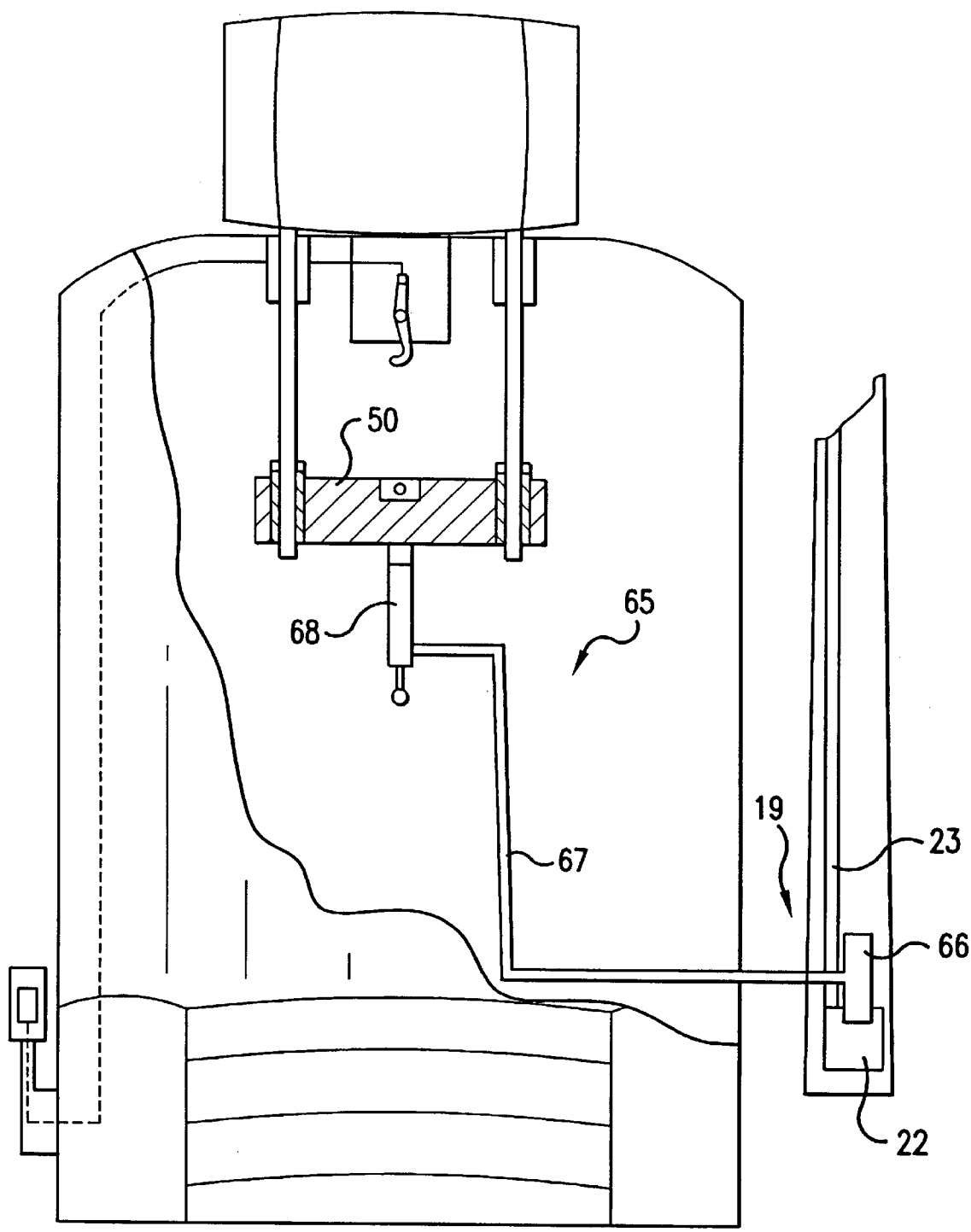
FIG. 5 is a schematic front view of the motor vehicle seat with the arrangement according to another embodiment of the invention.

FIG. 5 shows another embodiment of the arrangement, in which, instead of the above-described gear unit 32, a hydraulic, pneumatic or electric conveying unit 65 is used for transforming the translational movement of the belt strap 23 into a translational movement of the lifting slide carriage 50. This arrangement is used particularly when the automatic retractor system 19 is not integrated in the vehicle seat 10 but is arranged separately in the inside lining of the vehicle, for example, in the area of the C-columns.

If, for example, a pneumatic or hydraulic conveying unit 65 is used, the translational movement of the belt strap 23 by way of a valve 66 and a pressure line 67 causes a cylinder 68 to be acted upon by pressure corresponding to the withdrawal and retraction movement. In an electric conveying unit 65, an electric motor can be triggered corresponding to the translational movement of the belt strap 23 by a switch and a line corresponding to the withdrawal and retraction movement.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. In combination with a headrest and a backrest of a motor vehicle seat and a seat belt system, an arrangement is provided for coupling a vertical position of the headrest associated with the backrest with withdrawal and retraction movement of the seat belt system which includes a seat belt, a belt strap and a belt retractor, the arrangement comprising means for transforming withdrawal movement of the belt strap, to a position in which the seat belt is configured to be used by a vehicle occupant, into a movement of the headrest from a lower inoperative position into an upwardly displaced operative position and for transforming the retraction movement of the belt strap, from the position in which the seat belt is configured to be used, into an opposite movement of the headrest back into the inoperative position, and a locking unit for fixing the headrest in the operative position, wherein apparatus is provided for permitting, starting from the operative position, the headrest to be further selectively displaceable in the vertical direction with respect to the backrest to a desired adjusted position and to be lockable in the desired adjusted position.

2. The combination according to claim 1, wherein the movement of the headrest takes place from the inoperative position into the operative position approximately in a longitudinal direction of the backrest.

3. The combination according to claim 1, wherein the locking unit comprises a lifting slide carriage which a movement coupled with the withdrawal and the retraction movements of the belt strap and is moveable together with the headrest between an upper position and a lower position, and a headrest receiving device for providing vertical adjustability of the headrest with respect to a distance thereof from the lifting slide carriage and being lockable in the adjusted position, the lifting slide carriage releasably lockable in the upper position on the backrest.

4. The combination according to claim 3, wherein a triggering line is associated with the locking unit for releasing the lifting slide carriage again from the upper position when a buckle of the seat belt system is unlatched.

5. The combination according to claim 3, wherein means is provided to maintain the distance constant during movement thereof from the inoperative position into the operative position and from the operative position back into the inoperative position.

6. The combination according to claim 3, wherein, in the upper position of the lifting slide carriage, guide rods associated with the lifting slide carriage are associated sleeves after overcoming a predetermined holding force.

7. The combination according to claim 3, wherein the lifting slide carriage is lockable approximately at a quarter to three quarters of a withdrawal length of the belt strap in the upper position.

8. The combination according to claim 3, wherein the lifting slide carriage is configured to be displaceable back into the lower position approximately at a quarter to three quarters of a retracted length of the withdrawn belt strap.

9. The combination according to claim 3, wherein the withdrawal and retraction movement of the belt strap is transformed by a gear unit into coupled movement of one of the lifting slide carriage and the headrest.

10. The combination according to claim 9, wherein the gear unit includes a friction wheel unit arranged to transform a translation movement of the belt strap into a rotatory movement.

11. The combination according to claim 9, wherein the gear unit includes a free wheel for uncoupling movement of the headrest from the retraction movement of the belt strap when the belt strap reaches an inoperative position thereof.

12. The combination according to claim 9, wherein the gear unit is arranged to be blocked in the upper and the lower position of the lifting slide carriage.

13. The combination according to claim 12, wherein in the upper position of the lifting slide carriage, the belt strap, while overcoming a frictional force, is arranged to be moveable with respect to a friction wheel of the gear unit.

14. The combination according to claim 1, wherein the seat belt system includes an automatic retractor system integratable in the motor vehicle seat.

15. The combination according to claim 1, wherein in the operative position, the headrest is arranged to be in contact with an upper end of the backrest.

16. The combination according to claim 1, wherein the seat belt system includes an automatic retractor system arranged to be spacable from the motor vehicle seat.

17. The combination according to claim 1, wherein one of an electric, pneumatic and hydraulic conveying unit transforms the withdrawal and retraction movement of the seat belt into coupled movement of a lifting slide carriage of the locking unit and of the headrest.

* * * * *